Oct. 8, 1940.                     K. E. PEILER                        2,217,182
                APPARATUS FOR AND METHOD OF CIRCULATING
                     MOLTEN GLASS IN A FEEDING CONTAINER
                           Filed Nov. 4, 1937           3 Sheets-Sheet 1
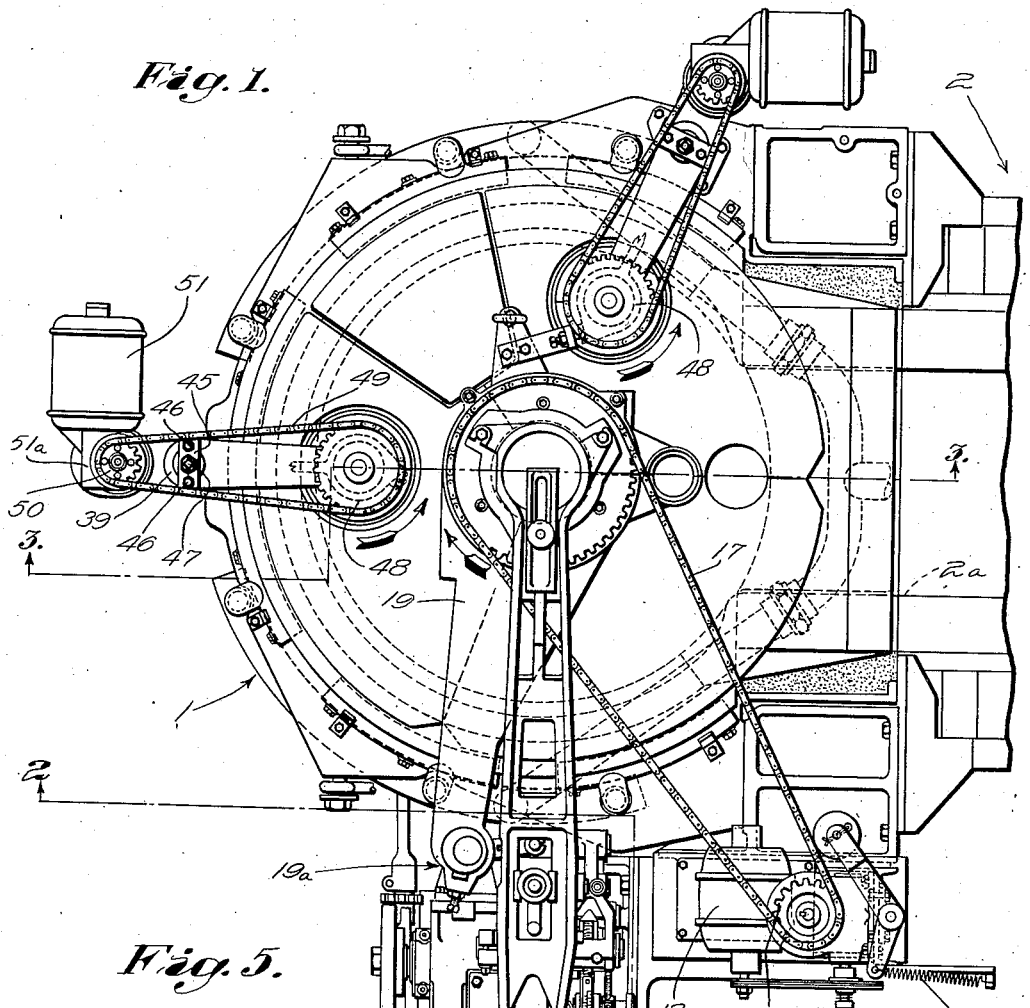
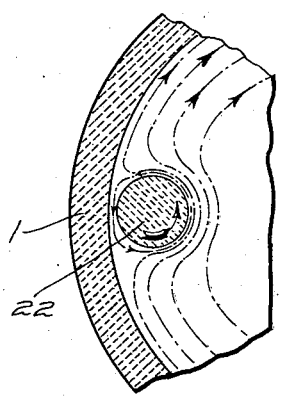
Witness:
W. P. Thayer.
Inventor;
Karl E. Peiler
by Brown + Parham
Attorneys Oct. 8, 1940.  K. E. PEILER  2,217,182
APPARATUS FOR AND METHOD OF CIRCULATING
MOLTEN GLASS IN A FEEDING CONTAINER
Filed Nov. 4, 1937  3 Sheets-Sheet 3

Witness:
W. R. Thayer.

Inventor:
Karl E. Peiler
by Brown & Parham
Attorneys

Patented Oct. 8, 1940

2,217,182

UNITED STATES PATENT OFFICE 2,217,182

APPARATUS FOR AND METHOD OF CIRCULATING MOLTEN GLASS IN A FEEDING CONTAINER

Karl E. Peiler, West Hartford, Conn., assignor to Hartford-Empire Company, Hartford, Conn., a corporation of Delaware Application November 4, 1937, Serial No. 172,709

15 Claims. (Cl. 49—56)

This invention relates to glass feeding apparatus in which a forehearth is connected to and receives molten glass from a melting tank or a like source of supply, and has at its outer end a delivery or feed chamber or feeding container from which glass is to be fed, gathered or otherwise removed for forming various types of glassware. The glass may be fed from a submerged discharge outlet, as in the embodiment shown, or portions thereof may be gathered from its surface.

The invention relates more particularly to glass feeding apparatus in which the temperature of the glass is controlled and regulated as the glass passes from the melting furnace to the feed chamber. When glass from a melting furnace is supplied or fed to forming machines by such an apparatus, it generally has to be changed in temperature—sometimes heated and sometimes cooled, but most generally cooled below the temperature of the melting furnace. For this purpose it is passed through a cooling section of the forehearth. During the cooling, temperature differences are set up in the cross section of the glass and the flow lines are influenced by the cooling action. It is generally attempted to correct this condition by then flowing the glass on its way to the discharge outlet through a uniformizing section, in which it is attempted to bring the glass to a uniform temperature, which temperature is that desired in the mold charge. Usually the glass flowing from the melting furnace into the forehearth is not uniform, either as to temperature or composition. Differences in composition are caused, not only by faults in melting but also by contamination from refractories going into solution as well as by tendency to stratify and sometimes to devitrify. This, together with differences in temperature, leads to cords and streaks of different composition or of different temperature flowing into the forehearth and down the length of its channel. In flowing down the channel of the forehearth, the glass is further contaminated by solution of the forehearth walls, as well as by stagnant pockets and devitrification. Any differences, streaks or cords tend to become localized by the natural flow lines so that they result in cords or streaks which flow into the mold charges or other gathered or discharged glass to form defects in the resulting glassware. These defects are generally in the form of longitudinal differences or cords or streaks in the manufactured article.

It is the general object of this invention to minimize these differences, cords or streaks as far as possible and to minimize effects on the strength and appearance of resulting glassware.

It is a further object of this invention to insure that the glass supplied by the feed chamber shall be as uniform in temperature as possible, so that mold charges fed to forming machines may have the greatest possible uniformity in temperature in spite of differences which existed in the glass before treatment.

A more specific object of the invention is to attenuate and disperse cords, streaks and differences as much as possible so as to minimize their effects on the strength and appearance of the resulting ware.

Another object of the invention is to disperse and blend such cords, streaks and differences in the body of the glass as far as possible, and to circulate and blend the body of the glass to produce a uniform temperature condition in the glass flowing to the discharge outlet.

Another and more specific object is to flow glass from a melting furnace at a hydrostatic level into a connected feed chamber, and thence around the periphery of the feed chamber and spirally to a submerged discharge outlet.

A further object is to subject all particles of glass going to the discharge outlet as nearly as possible to the same flow paths and heat treatment in passing through the feed chamber.

A still further object is to arrange all cords, streaks and other differences in a spiral pattern to minimize their effects on the strength of the resulting ware.

A further object of the invention is to provide for conjoint and cooperative action of highly efficient means for regulably controlling the temperature of the glass in the feeding container with improved means for mixing and uniformizing such glass so that the glass passing to the outlet will have both the temperature and the uniform condition required for the production of a regular succession of charges suitable for fabrication into satisfactory articles of glassware.

Other objects and advantages of the invention will hereinafter be pointed out or will become apparent from the following description of a practical embodiment of the invention, as disclosed in the accompanying drawings, in which:

Figure 1 is a plan view of a glass feeding apparatus for carrying the invention into effect;

Fig. 5 is a section in plan taken through the large body portion of one of the circulators and a portion of the feed chamber below the glass level.

In carrying out the invention, I propose to provide a container for molten glass, generally designated 1, which may constitute the outer end portion or so-called "feed bowl" or "feed spout" of a forehearth or tank extension, a portion of which is shown and designated 2.

Figure 3:
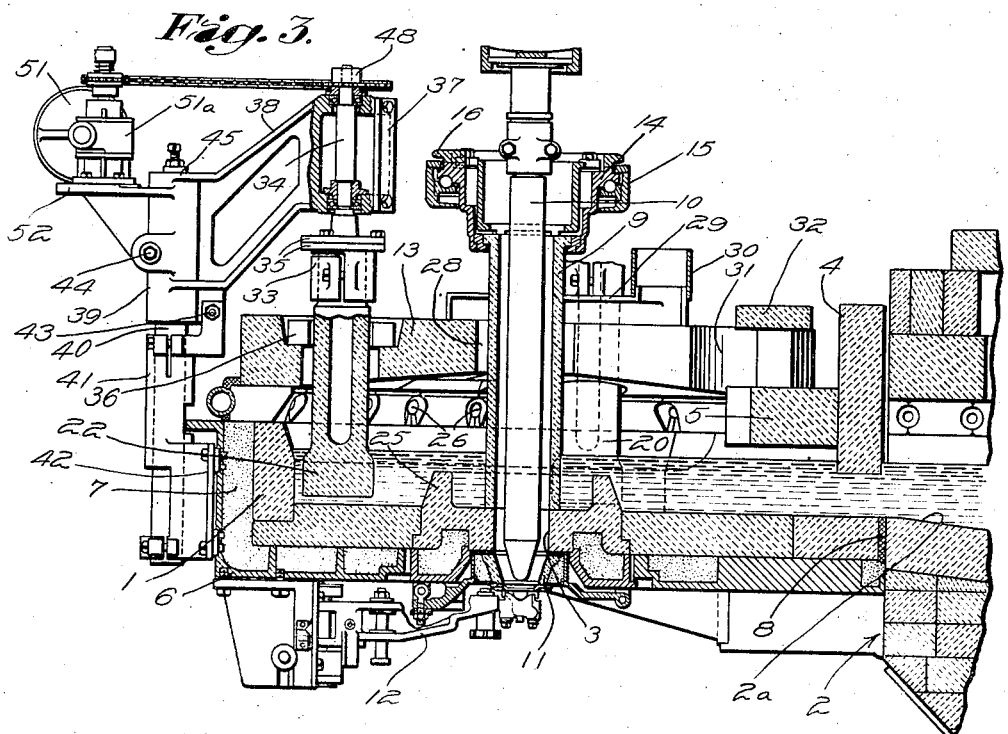
Fig. 3 is a longitudinal vertical section through the glass feeding apparatus, with parts thereof shown in elevation, the view being approximately along the line 3—3 of Fig. 1.
Figure 4:
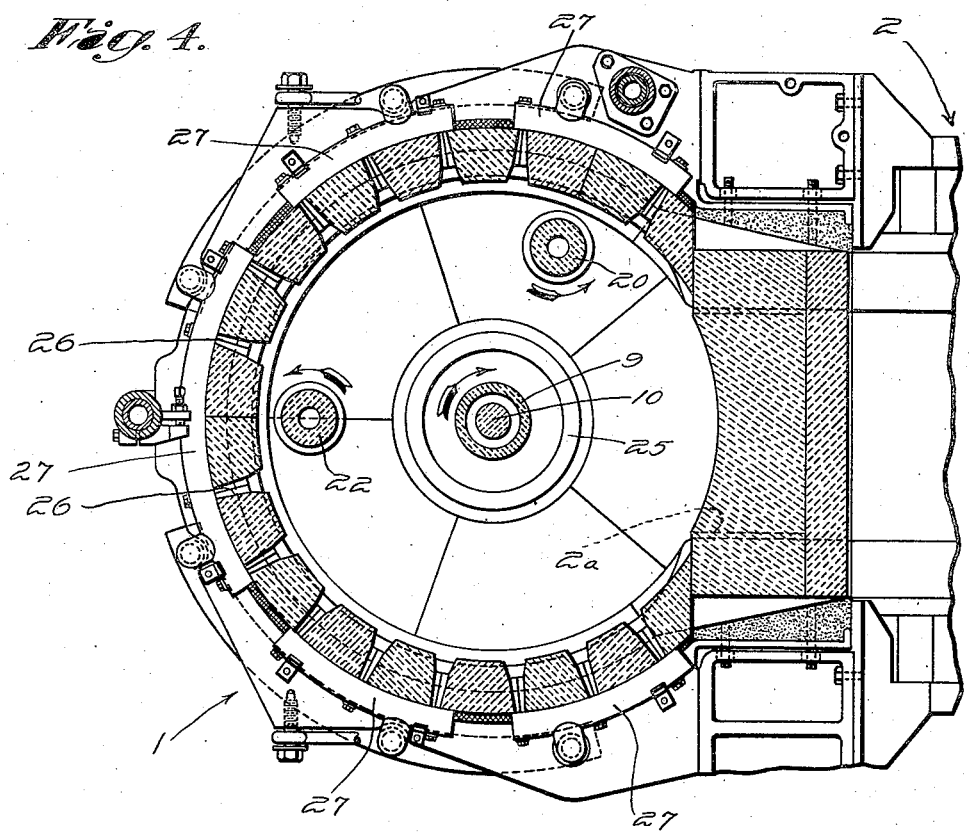
Fig. 4 is a horizontal section through the glass feeding apparatus, at a level above the glass therein, showing the manner in which such glass is mixed and uniformized as it passes to the discharge outlet of the feeding container.

The interior of the container 1 is of relatively great cross-sectional area, both with relation to the width of the channel 2a of the forehearth, as will be apparent from Figs. 1 and 4, and also with relation to the diameter of the discharge passage or well 3, as best shown in Fig. 3. Also the bottom of the container preferably is substantially flat and the side walls thereof are formed without angular or reentrant portions in contact with the glass, the interior of the container being substantially circular in cross-section. These features of construction and design aid in the prevention of stagnant portions of the glass feed body and permit attenuating and blending movements of all portions of the glass in the container.

Figure 6:
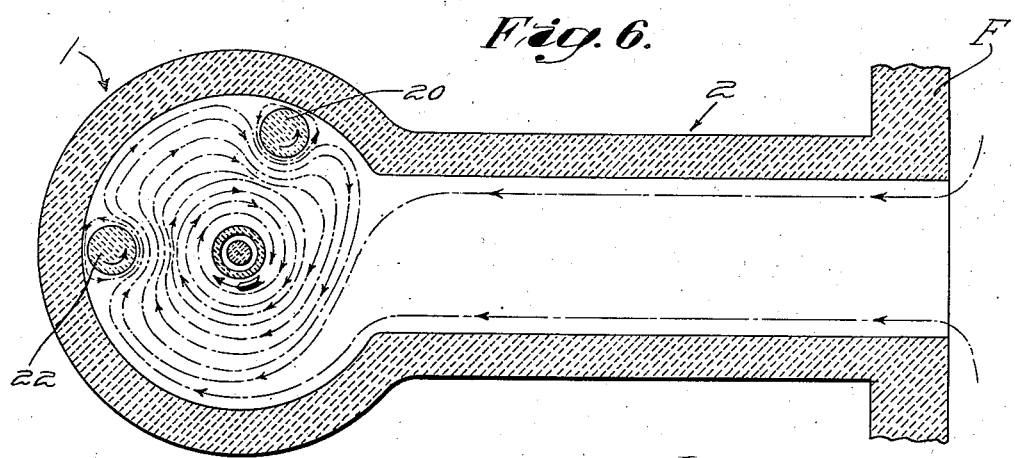
Fig. 6 is a diagrammatic plan of the entire apparatus connected to a glass melting furnace and showing flow lines.

The forehearth or tank extension may have the channel portion thereof constructed in any suitable known way of any suitable known means and may include or be provided with any suitable known mechanism or equipment for controlling the temperature and condition of the glass passing from the melting furnace or source of supply F (Fig. 6), along the forehearth channel to the feeding container 1. I prefer to employ a forehearth channel and associate means for regulably controlling the temperature and condition of the glass passing therethrough, substantially as shown in Patent No. 2,139,911, granted December 13, 1938 to myself and William T. Barker, Jr., for Forehearth for molten glass.

A skimmer block, best seen at 4 in Fig. 3, may be provided at the juncture of the glass feeding container 1 with the channel portion of the forehearth or tank extension. This skimmer block serves to effect practical separation between the spaces above the glass in the feeding container and in the supply channel of the forehearth and also to prevent ingress to the feeding container of any impurities at the surface of the glass supply stream in the forehearth channel. A horizontal baffle 5, Fig. 3, extends across the forehearth channel at the outer side of the skimmer block 4 and slightly above the glass entering the container 1.

The glass feeding container 1 may comprise refractory inner walls, supported and insulated by the use of any suitable or preferred means. As shown to advantage in Fig. 3, an outer metallic shell or frame structure 6 may be employed to retain insulating material, such as shown at 7, against the outer surface of the refractory walls of the feeding container or of such portions thereof as may be insulated to advantage by the use of such material. A suitable refractory cement, such as indicated at 8, may be employed at the juncture of the feeding container with the walls of the supply channel of the forehearth or tank extension. The frame structure of the glass feeding container may be connected with the frame structure of the forehearth proper or with any other convenient support so that the feeding container will be retained securely in place at the outer end of the forehearth channel.

The arrangement is such that a feed body of molten glass in the container 1 will be kept substantially at the level shown in Fig. 3, the glass out-put through the discharge outlet being compensated for by gravity flow of glass from the stream in the forehearth channel. A refractory tube 9, when in its lowered or flow-preventing position, as shown in Fig. 3, will prevent flow of glass from the feed body to the discharge passage or well 3. To permit operation of the feeding apparatus, the tube 9 is raised to a predetermined position so that glass will flow at the rate and in the volume desired beneath the lower end of the tube into the passage 3. Thence the glass will pass downwardly under the control of a reciprocating plunger 10 to and through a suitable orifice ring structure 11. The discharging glass will be formed into successive mold charge masses from which charges will be severed by the operation of the blades of a suitable shear mechanism 12.

Figure 2:
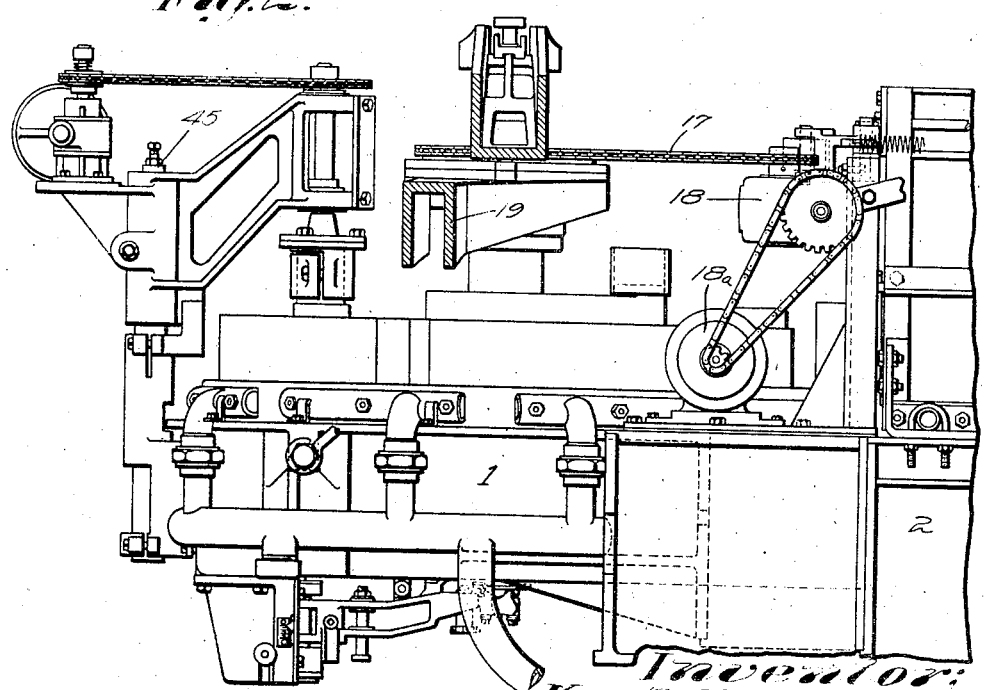
Fig. 2 is a view of the feeding apparatus, shown mainly in side elevation with portions in section, the view being taken approximately along the line 2—2 of Fig. 1.

The tube 9 is mounted for rotation about its axis, which is coincident with the axial line of the discharge passage. To this end, the tube 9 extends through a suitable aperture in the cover structure 13 of the feeding container and has its upper end portion secured to an annular holder 14 which is rotatably supported by a bearing structure 15. The upper end of the holder 14 is provided with a sprocket 16, whereby the holder and tube may be rotated as a unit by a chain drive 17 from a suitable driving mechanism, such as a speed reducing unit 18 which in turn is driven from a motor 18a, Figs. 1 and 2. The tube supporting bearing structure 15 may be carried by a suitable arm 19, Figs. 1 and 2, which may be adjustably supported at its outer end by suitable adjusting mechanism, indicated generally at 19a in Fig. 1, which may be similar to that which is fully disclosed in my Patent No. 1,735,837, granted Nov. 12, 1929, for Apparatus for feeding molten glass. The tube holder and its bearing structure likewise may be generally similar to like parts of the structure of Patent No. 1,735,837, differing from the latter mainly in the type of mechanism employed to rotate the tube. The means for supporting the plunger 10 and for reciprocating it vertically likewise may have substantially the construction and mode of operation which are disclosed in Patent No. 1,735,837 and therefore need not be described in detail herein.

Rotation of a tube, such as the tube 9, has been employed prior to the present invention to produce a circulation of glass around the discharge outlet of a feeder, but this was employed only to prevent the formation of stagnant areas or cold spots, and not for the purpose of attenuating, blending or uniformizing. Such rotation of the tube did not produce sufficient motion of the glass close to the outer wall of the container. Stirrers, acting as agitators, have also been employed, but such stirrers did not produce sufficient motion of the glass close to the outer wall or periphery of the container. Moreover such stirrers produced a wave on the surface, raising and lowering the levels periodically. This caused a periodic variation in the quantity of glass discharged and, therefore, of the weight of the mold charges and articles being made. Glass has also been poured into a revolving feed bowl, but this does not produce sufficient attenuation and blending of the streaks and of the glass in the bowl. It moreover requires careful regulation of the flow into the bowl and, therefore, is not as stable in operation as a feed bowl which is hydrostatically connected with the melting furnace as is the one in the present invention.

The present invention makes use of a rotating tube, not as the main means for producing circulation of the glass but merely to avoid the drag of a stationary tube on the glass, and as an aid in producing the circulatory movement in the center.

The present invention differs from the prior devices in that the glass flows from a hydrostatically connected melting furnace into a feed chamber and is at once flowed around the periphery of this chamber close to the outer wall. It is circulated by the dragging action exerted by the revolving circulators coacting with the adjacent wall portions to form a viscosity pump. The clinging of the glass to the outer wall, together with the drag exerted by the circulators, produce a shearing and attenuating action, which draws out and thins cords, streaks and inequalities and blends them. The blending action is further improved by the epicyclic circulation of portions of the glass around the circulators. The epicyclic orbits forcibly separate portions of the glass from the main path to blend them again with other portions from the main path. The blended glass with its cords and streaks minimized then approaches the central portion of the container and flows toward the discharge outlet. The levels of the glass surface in the container at all portions reach a balance and remain constant for any particular rate of discharge or delivery and, therefore, there is no variation in the quantity of glass delivered due to periodic level fluctuations.

The specific manner in which the streaks and inequalities are attenuated, dispersed and blended in the outer zone of the glass feed body and the means employed for that purpose according to the present invention, will now be described.

During repeated cycles of circulatory movement of the glass in the outer annular zone within the feeding container, the pull thereon from the vortex of glass, comprising the central portion of the glass supply body that is kept in circulation by rotation of the tube 9, will cause a continuous inward travel of glass from the circulating annular mass in the outer zone to the central vortex so that the latter will be continuously augmented at all points around its periphery with glass from the circulating, uniformized glass in the outer zone. This will compensate for the discharge of glass from the outlet.

It is to be noted that the circulators 20 and 22 are of substantial size in cross section, are located sufficiently close to the side walls of the glass feeding apparatus to force the extreme outer layer of the glass of the supply body into motion, and also have their lower ends sufficiently close to the bottom to prevent the accumulation of any stagnant portions or strata of glass at the bottom of the supply body. Thus, the outer annular mass of glass of the supply body contains only glass that is kept constantly in motion, generally in a circular path around the inner mass or vortex of glass of the central zone, but, also, at different places along this path, in more localized or secondary circular paths around the axes of the respective structures 20 and 22.

The glass that heretofore has been a relative quiescent portion of the glass supply body in a feeding container, is thus thoroughly mixed, commingled and uniformized. The rotation of the tube at the center of the supply body will continue the mixing and circulatory motion of the glass to prevent any delayed stratification and to complete the uniformization thereof should a further uniformizing action be required.

I prefer, in addition to providing for this extended and two-stage mixing and uniformizing of the glass, to provide a partial barrier between the circulating glass of the outer zone and the vortex of glass of the inner zone of such character as to permit passage of glass from the outer zone to the vortex only through the upper strata of glass of the supply body. This will bring all glass at or near the surface of the supply body and will constitute a further safeguard against passage to the vortex of glass that has been made colder and possibly also contaminated by contact with the refractory bottom and side walls of the container. Such colder and possibly contaminated glass is thoroughly commingled with and disseminated through the remainder of the glass of the outer zone before being permitted to enter the inner zone.

This baffle may comprise an upstanding annular wall, such as indicated at 25 in Fig. 3, of sufficient diameter to encompass the central portion of glass of the supply body in which the rotating tube 9 will be particularly effective as a glass circulating and uniformizing agent. The upper edge of the annular baffle or partial separating wall 25 is located at a predetermined distance below the surface of the supply body of glass in the feeding container. The diameter of the wall 25 is substantially greater than that of the discharge well or passage 3, and also that of the rotating tube 9.

The physical baffle or partial separator 25 may be dispensed with and good results still obtained as the provision of the central rotating tube 9 and means, such as the circulators 20 and 22 for circulating glass in the outer zone of the feeding container, will still produce a central vortex of glass surrounded by the circulating glass of the outer portion of the supply body, and will afford substantial assurance of satisfactory uniformization of glass of the supply body before such glass reaches the discharge passage.

The heating of the glass in the supply body preferably is accomplished by the use of a plurality of burners, spaced around the walls of the feeding container. As shown in Figs. 3 and 4, the side walls of the feeding container are provided at closely spaced intervals with the burner openings 26. Fuel supply manifolds 27 are associated with the walls of the feeding container and are provided with burner openings or nozzles for discharging a combustible mixture of air and gas through the burner openings 26 into the interior of the feeding container. With such a construction, a controllable uniform temperature may be produced around the entire periphery of the supply body of glass in the container to apply heat uniformly thereto or differential heating effects may be produced at different places above the glass in the feeding container if desired. The fuel supply and heat applying system, including manifolds or multiple nozzle plural burner pipes 27, may be substantially as disclosed in aforesaid Patent No. 2,139,911, granted Dec. 13, 1938, to myself and William T. Barker, Jr.

The spent gases from the burners may exhaust through an opening 28 surrounding the tube 9. To prevent objectionable heating of the mounting for the rotary tube holder, a baffle or conduit 29 may be disposed around the rim above the opening 28 so as to divert the issuing flames and hot gases laterally to a place at one side of the mounting 14, as through the vent pipe 30. Also, an opening 31 may be provided in the cover of the container, preferably at the center of the forehearth structure and adjacent to the juncture of the latter with the supply channel, to aid in regulating the temperature conditions within the space above the glass in the feeding container by serving as a vent for the gases and products of the combustion and as a means for aiding control of the pressure conditions within the feeding container. The effective size of this opening 31 may be controlled in any suitable known manner, as by covering it more or less by a refractory cover or damper block 32.

Instead of using two of the circulators for circulating glass in the outer zone of the feeding container, it is obvious that I may employ a third stirrer or even additional stirrers, the positions of the respective stirrers then being selected in relation to one another and to the juncture of the feeding forehearth with the supply channel so as to produce the main circulatory movement and the secondary circulatory movements desired. Also good results may be obtained by using only one circulator, in which case I prefer to use the circulator 20 so as to obtain favorable flow lines.

One of the features of this invention is the circulator and its method of operation, by which the molten glass is circulated in the feed chamber. This is illustrated in Figure 5, which shows the circulator 22 and a portion of the wall of the feed chamber. The circulator dips substantially vertically into the glass adjacent to the wall and projects as close to the bottom of the feed chamber as is practical. It is made of glass resistant refractory and is preferably substantially cylindrical in its glass contacting portion. When it is revolved about its vertical axis it exerts a drag on the glass. If the circulator is placed, as shown, sufficiently near to the wall, it will not be able to drag as much glass between itself and the wall as it can drag around on the side opposite to the wall. Under these conditions it will in coaction with the wall act as a pump and will cause the glass to be moved along the wall toward the circulator, then partly around the circulator, on the side away from the wall, and again along the wall, beyond the circulator, as indicated by the arrows on the upper portion of Fig. 5. Some of the glass close to the circulator will be carried around with it between it and the wall.

There is a most suitable position of the circulator relative to the wall, in which the maximum pumping or circulatory action is given to the glass along the wall of the feed chamber, and a minimum amount of glass is dragged around between the circulator and the wall. If the circulator is placed too near to the wall it may cause bubbles and blisters to form on the surface of the glass near the wall by causing portions of glass to lap over other portions of the glass in the feed chamber at the surface of such glass. For this reason the shank of the circulator, where it passes through the glass surface, is made of a smaller diameter than the working body of the circulator below the surface. If the circulator is placed too far from the wall, it merely drags around with it, in a continuous orbit, most of the glass which it can influence. The circulators should, therefore, be placed as close to the wall as is safe without forming bubbles or blisters in the glass. The rotative speed may also be too high and cause air bubbles to form in the glass. This speed should, therefore, be kept low enough to prevent the formation of bubbles, and yet high enough to produce the desired circulation. If one circulator is not enough to get the desired speed, then two or more may be employed, all urging the glass in the same direction along its desired path.

Although each circulator has the main functions of causing the glass to circulate about the feed chamber in the desired path, it also has other functions. As the glass moves along the wall to approach the circulator, it moves relatively more slowly than when it comes within the immediate influence of the circulator. As it approaches the circulator it moves more rapidly, being carried rapidly on an arc around the circulator, and as it leaves the circulator it moves along the wall with its original, slower speed. This causes any streaks or inequalities in the glass, such as cords due to contamination or other causes, and streaks of various kinds, to be stretched out or attenuated as they approach and pass by the circulator. Drawing out and attenuating these cords and streaks makes them of much smaller magnitude and hence of less damaging effect.

In addition to this, a portion of the glass adjacent to the circulator is carried around between it and the wall. This causes portions to be separated from other portions, and then remingled with still further oncoming portions, so that there results a blending or mingling action which serves to disperse streaks and cords and to blend inequalities in the glass. It should also be noted that the clinging of the viscous glass to the hot wall causes a shearing and pulling action between this clinging glass and the glass which is being circulated around the feed chamber. This drag of the walls opposing the drag of the circulators also causes an attenuation of cords and streaks, as well as of inequalities, tending toward further blending and dispersal.

Certain of the flow lines are shown by dot and dash lines in Figure 5. The flow lines are shown more completely by dot and dash lines in Fig. 6. The glass circulates around the outer boundary or periphery of the feed chamber, having a motion very close to the wall of the feed chamber in which feature this invention differs from existing glass circulating feed chambers or forehearths. This causes the glass flowing out from the melting furnace to enter the feed chamber and flow around it as shown by the dot and dash lines in Figure 6. The flow lines at the outer periphery follow the wall and pass close around the circulators on the side opposite to the wall within a small portion of the glass going between the circulators and the wall. These flow lines change their shape as they move toward the center of the feed chamber, becoming gradually more and more circular as they approach the middle. To produce the flow lines shown in Figure 6, it is essential that at least one circulator be placed near the entrance to the chamber from the channel with its direction of rotation opposing the flow from the channel into the chamber. This prevents the formation of a stagnant area which might otherwise form. Additional circulators may be added where convenient, if desired. It is, of course, possible to operate to advantage with a different arrangement of circulators even though there may be a stagnant area, but the arrangement shown is preferable.

On account of the flow lines or paths taken by each portion of glass, all portions are subjected to a similar heat treatment. This insures that inequalities of temperature will tend to be eliminated and that further inequalities will not be set up. This will be true to a large extent even if the firing or heating of the feed bowl is unsymmetrical or uneven. The heating arrangement which is shown has been found to produce a symmetrical distribution of temperature and thus lends itself to cooperation with the circulatory system to control the glass temperature as desired.

The circulators preferably are supported so that the depth to which they depend in the glass body may be adjusted. As shown best for the circulator 22 in Fig. 3, each of such circulators has its stem portion formed to be hollow, for the sake of lightness, and this stem is secured at its upper end to a chuck or detachable holder 33. This holder is in turn carried by a suitable vertical shaft 34 to which it is secured by cooperative flanges, indicated at 35. These flanges are sufficiently large to serve as heat shields, to prevent overheating of the overhead bearing structure for the shaft 3. Also, escape of heat from the feeding container through the opening in the cover structure for each of these stirrers may be further diminished by the use of suitable refractory blocks, such as indicated at 36 in Fig. 3.

The shaft 34 is mounted in a suitable bearing structure 37 on the end of an arm 38. The arm 38 has a split clamp sleeve 39 surrounding and normally fixedly secured to a vertical shaft 40. The latter is carried by a clamp 41 on a bracket structure 42 that is secured to the frame work structure of the feeding apparatus.

An adjustable stop screw 43 on an arm carried by the holder 41 limits the swinging movement of the arm 38 and its sleeve 39 when the latter has been loosened so that it may swing about the axis of the shaft 40, as by loosening the fastening screw 44. This is primarily for convenience in replacing the circulator. Such an operation may be accomplished by detaching the circulator from the holder 33, then swinging the arm 38 laterally of the feeding container, removing the circulator and substituting a new one, returning the arm 38 on its operative position against the stop screw 43 and securing the new stirrer to the holder 33. During such an operation, the sleeve 39 is held against downward movement on the shaft 40 by a bar 45 which extends across the upper end of the shaft 40 and is secured to the upper end portion of the sleeve 39 by the fastening devices 46 (see Fig. 1). An adjusting screw 47 is threaded through the bar 45 and bears against the top of the shaft 40. When this adjusting screw is turned, the arm 38 and the circulator carried thereby will be adjusted vertically, assuming of course that the split clamp sleeve 39 has been loosened in advance of such adjustment and thereafter will be tightened to maintain the adjustment.

Each of the shafts 34 of the respective circulator mechanism is provided at its upper end with a sprocket 48, connected by a chain 49 with a sprocket 50 that is driven by a motor 51 through a suitable speed reduction unit 51a (see Fig. 1). Each motor 51 and its connected speed reduction unit and drive sprocket are carried by a suitable bracket 52, integral with or rigidly connected with the sleeve 39 of the associated mounting structure for the stirrer in question. The whole mounting structure, including the driving mechanism, thus constitutes an integrated unit. Of course, other means may be employed to drive the circulators, either concurrently with the central rotating tube 9 or independently thereof.

The invention may be embodied in forms of structure other than that shown in the accompanying drawings and is not to be limited to such structure or beyond the terms of the appended claims.

What I claim is:

1. Glass feeding apparatus comprising a container having an outlet in its bottom in position to be submerged by a feed body of molten glass in the container, means for causing the glass of the central portion of said feed body to be circulated in a path approximately concentric with said outlet, other means for causing glass of the feed body outwardly of said central portion to be circulated in said container around said path of movement of said central portion, and means for preventing flow from the outer circulating portion of the feed body to the central portion thereof except at an upper portion of said feed body.

2. Glass feeding apparatus comprising a container for molten glass having an outlet in its bottom at the approximate center thereof, an annular wall extending upwardly in the glass of a feed body in said container and terminating at its upper edge below the surface of such glass, said annular wall being substantially concentric with said outlet and defining a central zone, means for imparting a substantially vertical movement about the axial line of said outlet to the glass of said central zone, and means for circulating in an outer annular zone the glass of the feed body that is located outwardly of said central zone while maintaining flow communications between the glass of the outer zone and the glass of the central zone at a level above said annular wall, said last named means being adapted to cause a localized secondary circulatory movement of glass entirely within said outer zone in addition to effecting circulatory movement of glass around said central zone.

3. Glass feeding apparatus comprising a container of substantially circular configuration at its interior and having an inlet at one side through which a stream of molten glass may flow from a source of supply, said container having an outlet in its bottom at its approximate center in position to be submerged by a feed body of the glass supplied to said container by said stream, means for circulating the glass of a central portion of said feed body to produce a vortex having an axis coincident with the axial line of the outlet, and other means for circulating glass of the feed body outwardly of said vortex to surround said vortex with a circulating portion of the feed body in flow communication with said vortex and to produce a localized secondary circulatory movement of glass in the outer circulating portion of the feed body.

4. Glass feeding apparatus comprising a container of substantially circular configuration at its interior and having an inlet at one side through which a stream of molten glass may flow from a source of supply, said container having an outlet in its bottom at its approximate center in position to be submerged by a feed body of the glass supplied to said container by said stream, means for circulating the glass of a central portion of said feed body to produce a vortex having an axis coincident with the axial line of the outlet, other means for circulating glass of the feed body outwardly of said vortex to surround said vortex with a circulating portion of the feed body in flow communication with said vortex at all points around the upper portion of the latter and to produce a localized secondary circulatory movement of glass in the outer circulating portion of the feed body, and means comprising burners spaced at intervals around the walls of said container for supplying heat to the entire surface of said feed body.

5. Glass feeding apparatus comprising a container for molten glass, of substantially circular internal configuration in cross section but open at one side to receive a stream of molten glass from a supply channel, said container having a substantially flat floor and having an outlet in its bottom at the approximate center thereof, a rotating tube depending into the glass in the container in axial alignment with the outlet for imparting a circulatory motion to a central portion of the body of glass in the container, a plurality of vertically disposed rotary circulators dipping into the glass in the container at places outside of the zone of said circulatory central portion for imparting to the remainder of the glass in the container a circulatory movement at the outer side of said circulating central portion of the glass body, and means for rotating each of said vertically disposed rotary circulators about its own axis.

6. Glass feeding apparatus comprising a container for molten glass, of substantially circular internal configuration in cross-section but open at one side to receive a stream of molten glass from a supply channel, said container having a substantially flat floor and having an outlet in its bottom at the approximate center thereof, a rotating tube depending into the glass in the container in axial alignment with the outlet for imparting a circulatory motion to a central portion of the body of glass in the container, a vertically disposed circulator rotating about its own axis and depending into the glass adjacent to the portion of the wall of the container opposite to the place at which said stream supplies glass to the container, and another vertically disposed circulator also rotating about its own axis and depending into the glass adjacent to another portion of the wall of the container at a place nearer to the place of entry of the supply stream of glass to the container than to the opposite portion of the container.

7. The method of circulating molten glass in a container which consists in subjecting successive portions of such glass to the viscous drag of a rotating implement projecting into the glass, forcing the glass acted on by the implement against an adjacent wall by the viscous drag of the rotating implement and, by the coaction of the wall with the implement, directing a portion of said glass along one portion of the wall in one direction and another portion of said glass along an adjacent portion of the wall in an opposite direction.

8. The method of attenuating and dispersing cords or streaks in a mass of molten glass in a container which consists in subjecting a portion of such mass to the viscous drag of a rotating vertical implement projecting into the glass mass and causing a temporarily accelerated intra-mass movement of the glass acted on by the implement, forcing one portion of the glass subjected to the drag of said rotating implement against an adjacent wall and along this wall in one direction while forcing another portion of the glass subjected to the drag of the implement along the wall in the opposite direction.

9. The method which comprises flowing molten glass from a source of supply in a stream through a glass flow channel to a glass feed or delivery chamber at the outer end of said flow channel, causing circulation of a central portion of the glass in said chamber, causing circulation of the outer portion of the glass in said chamber around said central portion, and causing a localized secondary circulation of glass in said outer portion.

10. The method which comprises flowing molten glass from a source of supply in a stream through a glass flow channel to a glass feed or delivery chamber at the outer end of said flow channel, causing circulation of a central portion of the glass in said chamber, causing circulation of the outer portion of the glass in said chamber around said central portion, and causing local circulations of glass included in said outer portion at a plurality of places spaced angularly around said central portion.

11. The method which comprises flowing molten glass from a source of supply in a stream through a glass flow channel to a glass feed or delivery chamber at the outer end of said flow channel, causing circulation of a central portion of the glass in said chamber, causing circulation of the outer portion of the glass in said chamber around said central portion, and causing a localized secondary circulation of glass in said outer portion in a direction opposite to the direction of circulation of said outer portion of the glass in said chamber.

12. The method which comprises flowing molten glass from a source of supply in a stream through a glass flow channel to a glass feed or delivery chamber at the outer end of said flow channel, causing circulation of a central portion of the glass in said chamber, causing circulation of the outer portion of the glass in said chamber around said central portion, and altering the flow lines of the circulating outer portion of glass in said chamber at one place along its path of circulatory movement by causing at that place a localized circulation of a relatively small part of such glass at a speed greater than that of the adjacent glass in said circulating outer portion and in a direction of circulation opposite thereto.

13. The method which comprises flowing molten glass from a source of supply in a stream through a glass flow channel to a glass feed or delivery chamber at the outer end of said flow channel, causing circulation of a central portion of the glass in said chamber, causing circulation of the outer portion of the glass in said chamber around said central portion in such manner and direction as to cause all the incoming glass from the flow channel to be diverted laterally at the intake end of the glass feed or delivery chamber into the circulating outer portion of glass in said chamber and to move as part of such circulating outer portion of glass more than a complete trip around the circulating central portion of the glass in said chamber.

14. Glass feeding apparatus comprising a flow channel, a feed or delivery chamber at the outer end of said flow channel with the vertical central axis of said chamber located on the longitudinal median line of the apparatus, said chamber being approximately circular in horizontal sectional configuration and having a diameter greater than the width of the adjacent end of said flow channel, and means for circulating glass in the feed or delivery chamber, said means comprising a vertical implement adapted to rotate about its own axis and depending into the glass in the chamber eccentrically thereof and sufficiently close to the wall of a side portion of said chamber to coact therewith to force most of the glass acted on by the implement along said wall away from said implement without passing between said implement and said wall, and means for rotating said implement about its own axis.

15. Glass feeding apparatus comprising a flow channel and a feed or delivery chamber at the outer end of said flow channel, said chamber having an outlet in its bottom at its approximate center on the longitudinal median line of the apparatus, said chamber being approximately circular in horizontal sectional configuration and having a diameter greater than the width of the adjacent end of said flow channel, means for circulating the glass of a central portion of said feed body in a clockwise direction to produce a vortex having an axis coincident with the axial line of the outlet, and a vertical implement depending into the glass in the chamber and adapted to rotate about its own axis, said implement being located adjacent to the juncture of the flow channel with said chamber and sufficiently close to the wall of a side portion of said chamber to coact therewith to force most of the glass acted on by the implement along said wall away from said implement without passing between said implement and said wall, and means for rotating said implement in a counterclockwise direction.

KARL E. PEILER.